(12) United States Patent
Wei et al.

(10) Patent No.: US 8,213,794 B2
(45) Date of Patent: Jul. 3, 2012

(54) PROGRAMMABLE OPTICAL NETWORK ARCHITECTURE

(75) Inventors: Wei Wei, Plainsboro, NJ (US); Junqiang Hu, Princeton, NJ (US); Lei Zong, Princeton, NJ (US); Dayou Qian, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 645 days.

(21) Appl. No.: 12/370,086

(22) Filed: Feb. 12, 2009

(65) Prior Publication Data

US 2009/0226169 A1  Sep. 10, 2009

Related U.S. Application Data

(60) Provisional application No. 61/027,987, filed on Feb. 12, 2008.

(51) Int. Cl.
*H04J 14/02* (2006.01)
*H04J 14/00* (2006.01)

(52) U.S. Cl. ............... 398/48; 398/45; 398/50; 398/76

(58) Field of Classification Search ............ 398/42, 398/45, 48–51, 65–68, 74, 76, 79
See application file for complete search history.

(56) References Cited

U.S. PATENT DOCUMENTS

| | | | | |
|---|---|---|---|---|
| 5,956,165 | A * | 9/1999 | Fee et al. ............... | 398/78 |
| 8,000,604 | B2 * | 8/2011 | Qian et al. ............... | 398/89 |
| 2002/0122617 | A1 * | 9/2002 | Nakajima et al. ............... | 385/16 |
| 2002/0146198 | A1 * | 10/2002 | Strasser et al. ............... | 385/17 |
| 2007/0242625 | A1 * | 10/2007 | Dunne et al. ............... | 370/258 |
| 2008/0153434 | A1 * | 6/2008 | Akiyama et al. ............... | 455/103 |
| 2008/0181605 | A1 * | 7/2008 | Palacharla et al. ............... | 398/50 |
| 2008/0267630 | A1 * | 10/2008 | Qian et al. ............... | 398/89 |
| 2009/0074415 | A1 * | 3/2009 | Xie ............... | 398/79 |

OTHER PUBLICATIONS

Junqiang et al, "OFDM based Adaptive and Programmable Optical network", Jul. 9, 2010, OptoeElectronics and Communications Conference (OECC), 2010 15th, p. 118-119.*
S. Peng, K. J. Hinton, J. Baliga, R. S. Tucker, Z. Li, and A. Xu, "Burst Switching for Energy Efficiency in Optical Networks," in Optical Fiber Communication Conference, OSA Technical Digest (CD) (Optical Society of America, 2010), paper OWY5. http://www.opticsinfobase.org/abstract.cfm?URL=OFC-2010-0WY5.*
Huang et al, "Lightwave Centralzied WDM-OFDM-PON", Sep. 2008, Optical Communication, 2008. ECOC 2008. 34th European Conference, vol. 4, p. 51-52.*
Junqiang et al, "OFDM based Adaptive and Programmable Optical network", 9, Jul. 2010, OptoeElectronics and Communications Conference (OECC), 2010 15th, p. 118-119.*
S. Peng, K. J. Hinton, J. Baliga, R. S. Tucker, Z. Li, and A. Xu, "Burst Switching for Energy Efficiency in Optical Networks," in Optical Fiber Communication Conference, OSA Technical Digest (CD) (Optical Society of America, 2010), paper OWY5. http://www.opticsinfobase.org/abstract.cfm?URI=OFC-2010-OWY5.*
Zhou et al, "Joint optimization of downlink subcarrier allocation and PAPR reduction for OFDM based on-board switching scheme", 10, Oct. 2009, Issue 8, p. 169-173.*
Huang et al, "Lightwave Centralized WDM-OFDM-PON", Sep. 2008, Optical Communication, 2008. ECOC 2008. 34th European Conference, vol. 4, p. 51-52.*

* cited by examiner

*Primary Examiner* — Nathan Curs
*Assistant Examiner* — Tanya Ngo
(74) *Attorney, Agent, or Firm* — Jeffrey Brosemer; Joseph Kolodka

(57) ABSTRACT

A programmable optical network architecture and associated components employing a two-level orthogonal frequency division multiplexing (OFDM)/wavelength division multiplexed (WDM) mechanisms for bandwidth virtualization.

3 Claims, 5 Drawing Sheets

PROGRAMMABLE OPTICAL NETWORK ARCHITECTURE

CROSS REFERENCE TO RELATED APPLICATIONS

This application claims the benefit of U.S. Provisional Application No. 61/027,987 filed Feb. 12, 2008.

FIELD OF THE INVENTION

This invention relates generally to the field of optical networking. More particularly, it pertains to a programmable optical network mesh architecture employing orthogonal frequency division multiplexing (OFDM).

BACKGROUND OF THE INVENTION

As internetworking and "The Internet" continue to evolve they continue to play an ever-increasing role in everyday life. Accordingly, techniques and/or developments that facilitate internetworking development would represent a significant advance in the art.

SUMMARY OF THE INVENTION

Such advance in the art is made according to the principles of the present invention directed to a programmable optical mesh network architecture (called PONIARD) utilizing two-level switching, i.e., wavelength and sub-carrier multiplexing and grooming technologies (optical orthogonal frequency division multiplexing-OFDM/WDM), which in turn utilizes digital signal processing (DSP) technologies for sub-wavelength bandwidth virtualization combined with lightpath transparency.

Optical mesh networks constructed according to the principles of the present invention exhibit unique flexibility with respect to resource sharing and partitioning while advantageously supporting different bit rates, different communication services, and modulation/coding techniques on different sets of sub-carriers and wavelengths.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, the diagrams herein represent conceptual views of illustrative structures embodying the principles of the invention. By way of some additional background those skilled in the art will readily appreciate that an underlying principle of orthogonal frequency division multiplexing (OFDM) is the transmission of data via a number of orthogonal subcarriers, each carrying a relatively low data rate. As a result, the data period may be enlarged and inter-symbol interference is reduced in a multi-path channel. Since dispersion in optical communication systems (both chromatic dispersion (CD) and polarization mode dispersion (PMD)) produces effects similar to those of encountered in multi-path; applying OFDM to optical transmission may advantageously reduce the dispersion and perhaps the need for dispersion compensation fiber.

Figure 1:
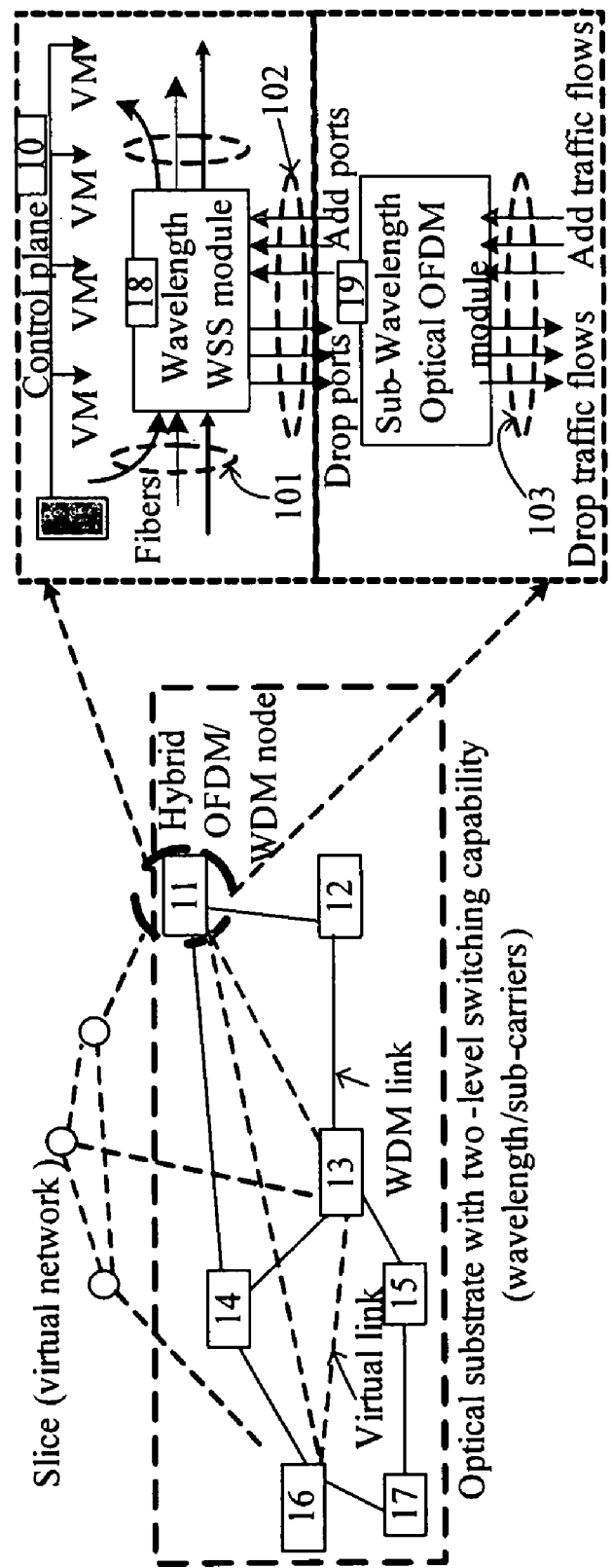
FIG. 1 is a block diagram depicting a mesh network architecture employing optical OFDM over WDM according to the present invention.

Turning now to FIG. 1, there is shown a block diagram of a mesh network employing OFDM over WDM according to the present invention. The optical mesh network includes a number of hybrid nodes 11-17 which all present wavelength switching and sub-wavelength (subcarrier) switching. As configured, any slices (virtual network) are mapped into the optical mesh including node mapping and virtual link mapping.

As shown in FIG. , the programmable optical network architecture that is the subject of the present invention offers a flexible bandwidth granularity (for example, the bandwidth of sub-carrier is close to 40 Mb/s, a typical 256 sub-carriers configuration on a wavelength with 10 Gb/s data rate), can emulate most any kind of virtual link, and natively supports multiple slices simultaneously/transparently.

In particular, the node structure shown in FIG. 1, supports two levels of bandwidth virtualization (i.e., wavelength and sub-wavelength) with less control overhead in the frequency domain and provides better isolation for slices in terms of traffic management and QoS control than those temporal domain systems. Each wavelength or sub-wavelength (i.e., subset of sub-carriers) may carry arbitrary format of packets/bursts/flows.

As depicted in FIG. 1, there are two basic modules at each node in the transport plane. An optical wavelength selective switch (WSS) module (18) is dedicated to any slices that require transparency is generally a cross-connect (or multi-degree ROADM) having a limited number of add/drop ports (102). Advantageously, any wavelength can be dropped/added by appropriately configuring the module.

As such, if we wish to receive a subset of sub-carriers and send different data out, any intermediate nodes will terminate the whole wavelength. As a result, all sub-carriers on this particular wavelength have to be received/digitally processed.

An optical OFDM module (19) dedicated for the sub-wavelength handling is primarily responsible for sub-carrier multiplexing, switching, and grooming. In a preferred embodiment, a sub-carrier allocation table is used to determine whether to transfer only a subset of sub-carriers necessary to be processed by programmable routers and to switch/groom other sub-carriers directly to other outlet(s). This bandwidth resources allocation table is preferably created and maintained by a node management module (10) located in the control plane, and is also responsible for sharing node control processing resources (e.g., virtual machine—VM).

Figure 2:
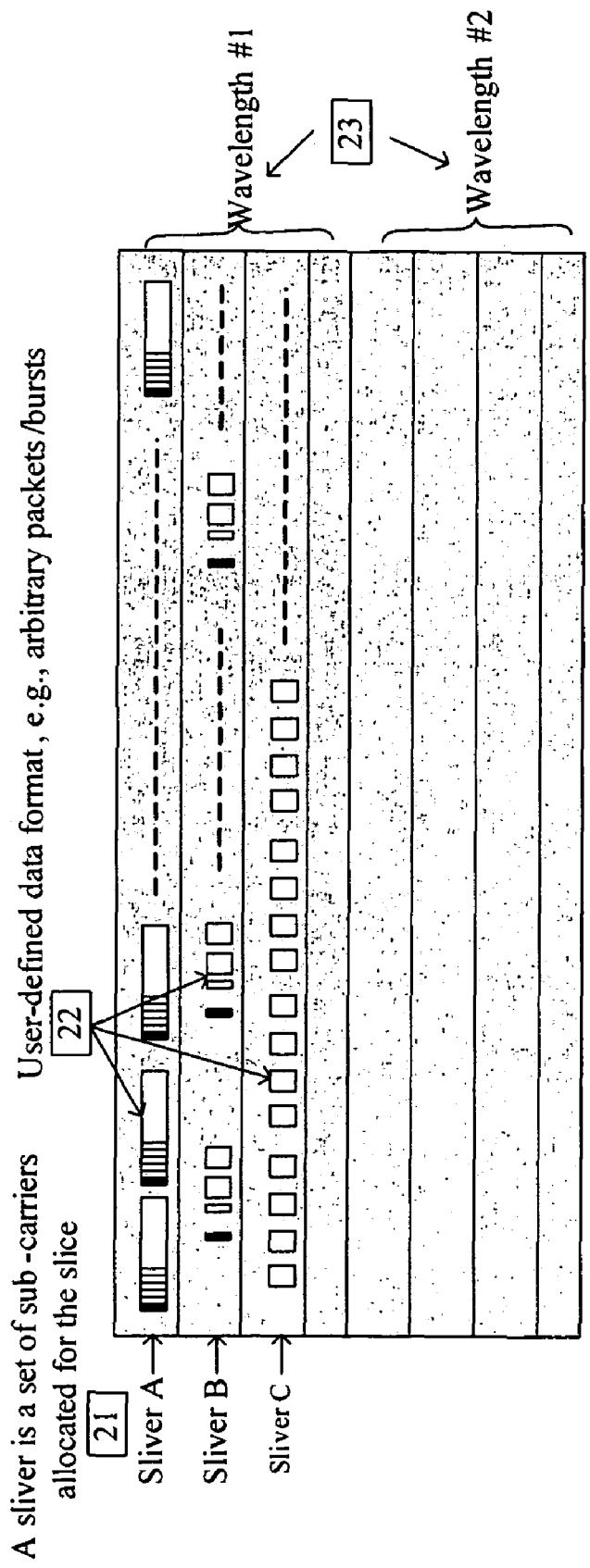
FIG. 2 is a block diagram depicting a programmable multiplexer for optical OFDM over WDM according to the present invention.

Turning now to FIG. 2, there is shown a simple schematic block diagram depicting optical OFDM transmission over a WDM programmable multiplexing structure according to an aspect of the present invention. As shown in that FIG. 2, two wavelengths namely, Wavelength #1 and Wavelength #2 (23) are carried on one WDM link.

More particularly, inside the wavelength (Wavelength #1 in this example) there are three slivers namely Sliver A, Sliver B, and Sliver C (21) wherein a sliver is a set of subcarriers allocated to a slice and which can carry arbitrary types of user-defined data (22). As can be appreciated, each sliver therefore may carry different types of packets, bursts, or other types of formats (e.g., jumbo frames) which are advantageously transparent, flexible and programmable as required.

Figure 3:
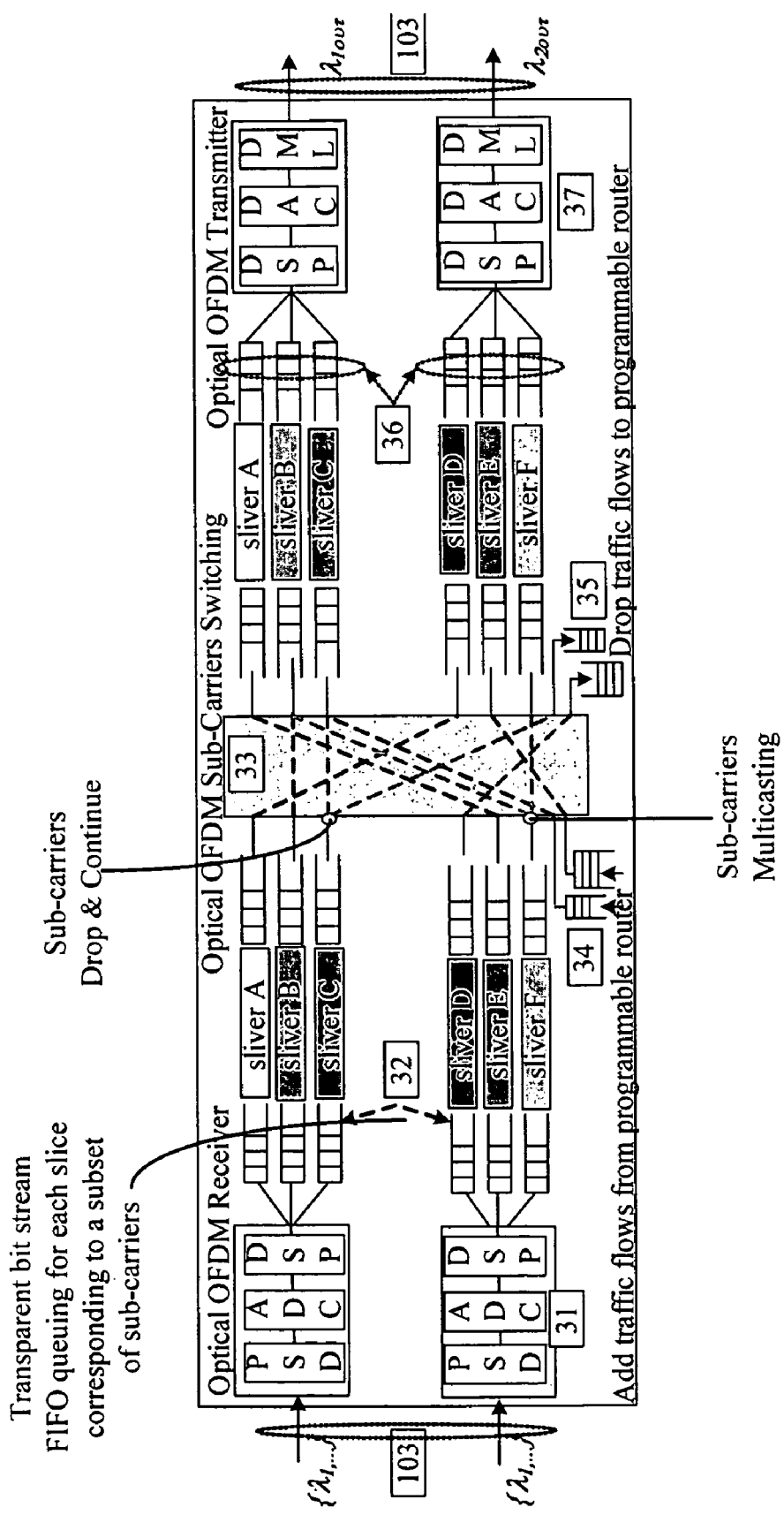
FIG. 3 is a block diagram depicting an optical OFDM module according to the present invention.

Turning now to FIG. 3 there is shown the details of an optical OFDM module (19) according to the present invention. The module includes optical OFDM receivers (31) including a parallel signal detector (PSD), a high speed analogue-to-digital converter (ADC), and a digital signal processor (DSP) which provide such functions as e.g., QAM demodulation, and FFT etc). Sliver input FIFOs (32) provide for transparent bit stream queuing. Optical sub-carriers switching (33) module provides for multi-rate sliver switch supporting such functionalities as cut-through, drop-and-continue and multicasting operations.

Source traffic flows from programmable router (34) while sink traffic flows to programmable router (35). Sliver output FIFOs (36) which are ready for optical OFDM multiplexing/modulation, are output into optical OFDM transmitters (37). As shown, the transmitters (37) include digital signal processors (DSP) (for QAM modulation and IFFT), high-speed analogue-to-digital converters (ADC), and direct modulation lasers (DML).

We note that the OFDM module (19) employs a receiver structure we call parallel signal detection (PSD) which captures any essential features of parallel sub-carrier multiplexing—other than consecutive time-slot multiplexing. Advantageously, this receiver structure can receive multiple non-overlapping baseband signals at different wavelengths simultaneously resulting in a device which is both cognitive and supports opportunistic transmission by using the tunable laser and multicasting traffic flows effectively.

Despite its numerous advantages however, we note that the PSD structure cannot receive two signals with the same wavelength due to beat noise. In particular, when compared to TDMA/WDM systems those skilled in the art will readily appreciate that with a PSD structure such as that now shown it is not necessary to employ a strict synchronization or complicated scheduling in a developmental OFDM/WDM system. In the logical sense, due to the essential features of PSD/OFDM employed the complexity of the receivers may be reduced. Finally, the wavelength(s) and subcarriers may be intelligently assigned to minimize the number of transceivers and accordingly, reduce the total substrate building cost.

Figure 4:
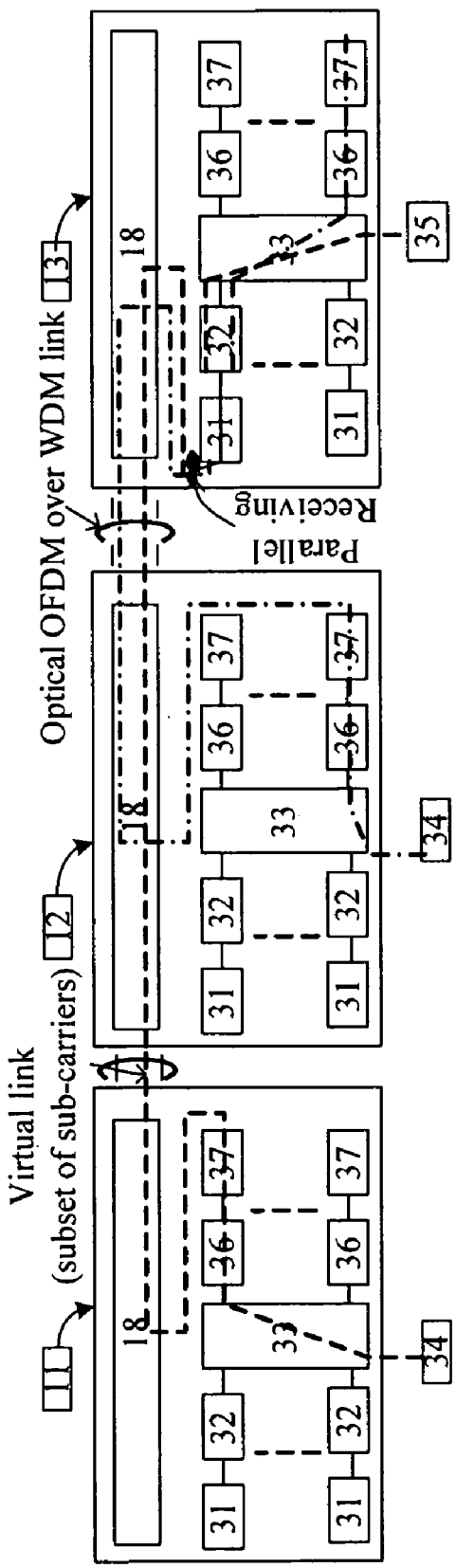
FIG. 4 is a block diagram depicting dynamic two-level switching and parallel receiving according to the present invention and FIG. 5 is a block diagram depicting a hybrid optical OFDM/WDM node and Optical OFDM module according to the present invention.

Our inventive architecture can be understood operationally with reference now to FIG. 4. As an example, we show how to assign wavelengths and sub-carriers while demonstrating dynamic two-level wavelength/sub-carrier switching as well as the advantageous reduced-receiver usage as compared to conventional TDM systems.

Shown in FIG. 4 are three nodes (11)(12)(13) which were also schematically shown in FIG. 1. With reference to those figures node (11) is shown establishing a virtual link to node (13) from source (34) to destination (35).

To effect such virtual link, control plane (10) allocates a subset of sub-carriers on wavelength #1 for this purpose, which defines a path that goes through sub-carriers switching module (33), optical OFDM transmitter(36)(37), three wavelength selective switching (WSS) modules (18)(in module 11, 12 and 13), optical OFDM receiver (31)(32), sub-carriers switching module (33).

Similarly, if a simultaneous virtual link is to be established from node (12), the control plane (10) allocates a different subset of sub-carriers on wavelength #2, which define a path that goes through sub-carriers switching module (33), optical OFDM transmitter(36)(37), two wavelength selective switching (WSS) modules (18). Advantageously, we can see that as shown in FIG. 4—due to PSD employed in the node structure—only one receiver to receive all the signals in these two wavelengths is needed.

Figure 5:
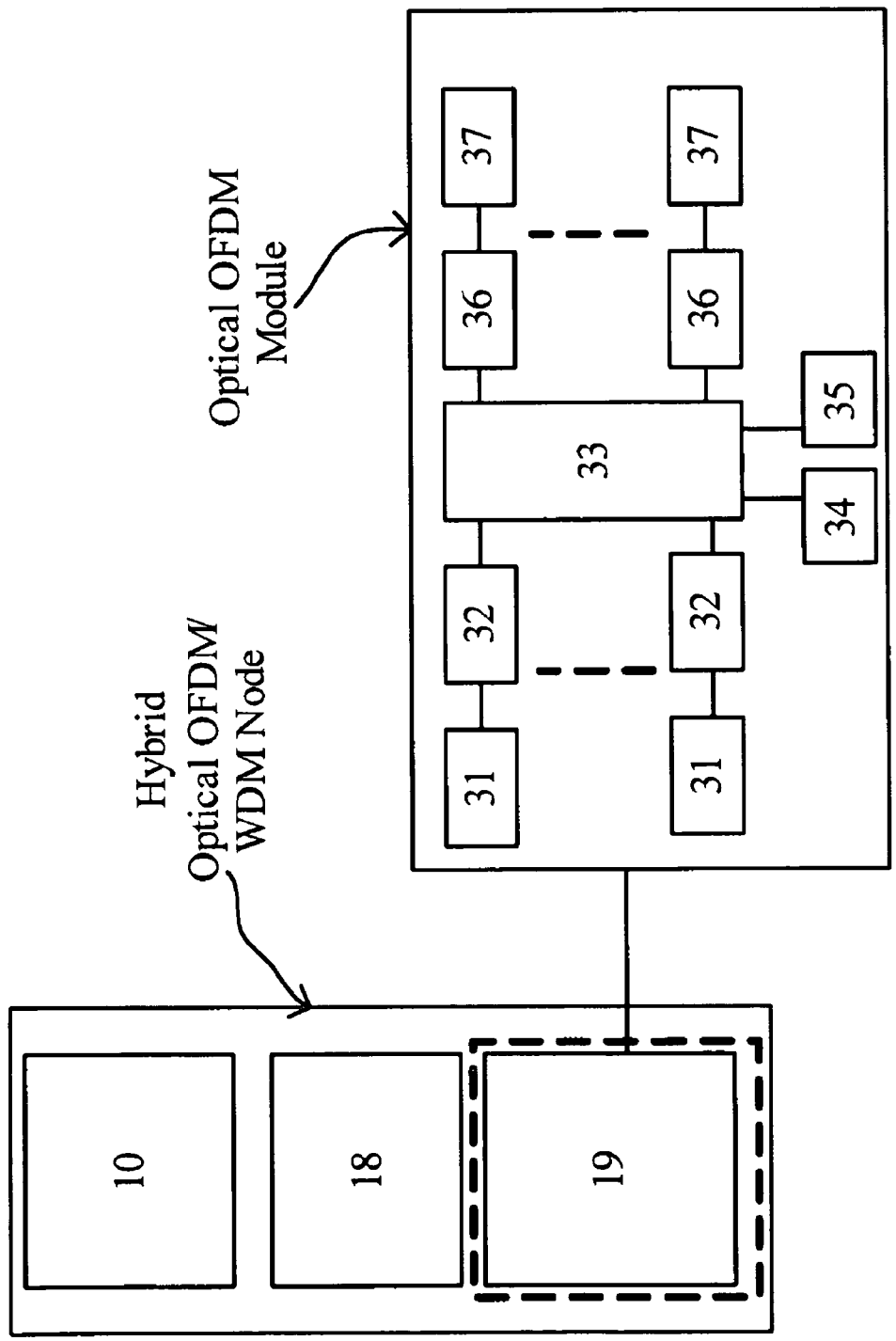

FIG. 5 is a block diagram depicting a hybrid optical OFDM/WDM node and Optical OFDM module according to the present invention. Summarizing, the hybrid optical OFDM/WDM node comprises a node management module (10), a wavelength selective switching module (18), and an optical OFDM module (19) which is further shown in more detail in that FIG. 5. As shown further, the OFDM module (19) includes a plurality of receivers (31)(32) in communication with a plurality of transmitters (36)(37) via switch module (33). Advantageously, this arrangement permits a source (34) of a particular module to communicate with a destination (35) of another module using our OFDM/WDM technique described herein.

Accordingly, and as can now be readily appreciated by those skilled in the art, multi-subcarrier OFDM over WDM is a viable approach to virtualization and bandwidth sharing of WDM links to create isolated slices. This is especially true in mesh networking environments as it can reduce the high hardware and software complexity and cost, as well as protocol overhead associated with SONET or NG-SONET based approaches (such as VCAT and LCAS). In addition, when compared to statistical, or queuing based approaches including virtual Ethernet connections, using OFDM can approach 100% bandwidth guarantee and 100% isolation among different sub-wavelength connections, and potentially more flexible bandwidth allocations. Moreover, when compared to a strict TDMA/WDM system where time slots are allocated to different communication pairs, OFDM is much easier/less costly to implement since it does not need strict time synchronization among all the nodes. In addition, in OFDM, all nodes can transmit simultaneously (on different sub-carriers) and more importantly, using different bit-rates and modulations, whereas in TDM, nodes have to buffer their data and wait for their time slots to transmit and furthermore, the data rate in different slots usually is fixed to enable clock recovery. Thus, using OFDM/WDM can result in much more natural slices than using TDMA/WDM.

At this point, while we have discussed and described the invention using some specific examples, our teachings are not so limited. Accordingly, the invention should be only limited by the scope of the claims attached hereto.

The invention claimed is:

1. A network architecture comprising:
a plurality of nodes interconnected with one another in a mesh topology wherein said interconnections are optical wavelength division multiplexed (WDM);
CHARACTERIZED IN THAT
communications between the nodes employs optical orthogonal frequency division multiplexing (OFDM) over the WDM interconnections;
wherein each one of said nodes comprise:
- a control plane virtualization module;
- a wavelength selective switch (WSS) module for wavelength switching; and
- an OFDM module for sub-carrier switching; and
wherein said OFDM module includes:
- a plurality of OFDM receivers;
- a plurality of OFDM transmitters;
- a sub-carrier switch interconnecting the receivers to the transmitters.

2. The architecture of claim 1 wherein said OFDM module further includes;
- a plurality in input FIFOs, interconnecting the receivers to the sub-carrier switch;
- a plurality of output FIFOs, interconnecting outputs of the subcarrier switch to inputs of the transmitters,
wherein each one of said FIFOs queue a subset of sub-carriers.

3. The architecture of claim 2 wherein said OFDM module further includes: the plurality of receivers each having:
- a parallel signal detector;
- a high speed analogue to digital converter; and
- a digital signal processor;
the plurality of transmitters each having:
- a packet received at an incoming internal input can only be sent to an outgoing outside connection.

* * * * *